(12) United States Patent
Li et al.

(10) Patent No.: US 11,841,342 B2
(45) Date of Patent: Dec. 12, 2023

(54) SHEAR-TYPE VIBRATION-ULTRASONIC COMPOSITE SENSOR AND MEASURING DEVICE

(71) Applicant: XI'AN JIAOTONG UNIVERSITY, Shaanxi (CN)

(72) Inventors: Junhao Li, Shaanxi (CN); Yanfeng Song, Shaanxi (CN); Zhaoyu Zhang, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/891,742

(22) Filed: Aug. 19, 2022

(65) Prior Publication Data
US 2023/0079598 A1 Mar. 16, 2023

(30) Foreign Application Priority Data
Aug. 31, 2021 (CN) .......................... 202111017894.1

(51) Int. Cl.
*G01N 29/24* (2006.01)
*G01N 29/09* (2006.01)
*G01N 29/04* (2006.01)

(52) U.S. Cl.
CPC ........... *G01N 29/09* (2013.01); *G01N 29/041* (2013.01); *G01N 29/2437* (2013.01); *G01N 2291/018* (2013.01); *G01N 2291/023* (2013.01)

(58) Field of Classification Search
CPC .. G01N 29/09; G01N 29/041; G01N 29/2437; G01N 29/221; G01N 29/28; G01N 2291/018; G01N 2291/023; G01D 5/54; G01D 5/62; G01D 21/02
See application file for complete search history.

(56) References Cited

U.S. PATENT DOCUMENTS

| | | | |
|---|---|---|---|
| 2014/0159546 A1* | 6/2014 | Kim | H10N 30/50 310/366 |
| 2018/0234077 A1* | 8/2018 | Ishimasa | H03H 9/19 |
| 2019/0229256 A1* | 7/2019 | Dejaeger | H10N 30/871 |

* cited by examiner

*Primary Examiner* — Suman K Nath

(57) ABSTRACT

The present disclosure discloses a shear-type vibration-ultrasonic composite sensor and a measuring device. In the shear-type vibration-ultrasonic composite sensor, a metal matching layer includes an insulating layer arranged on a lower surface and a supporting pillar arranged on an upper surface, the metal matching layer is in contact with a to-be-detected object via the insulating layer, a first negative electrode face of a first normal piezoelectric element is attached to one side of the metal matching layer, a first positive electrode face of the first normal piezoelectric element is attached to a second positive electrode face of a second normal piezoelectric element, a second negative electrode face is attached to a first surface of a backing block, and a second surface of the backing block is provided with a metal housing.

18 Claims, 6 Drawing Sheets

SHEAR-TYPE VIBRATION-ULTRASONIC COMPOSITE SENSOR AND MEASURING DEVICE

CROSS-REFERENCE TO RELATED APPLICATION

This application claims priority from the Chinese patent application 2021110178941 filed Aug. 31, 2021, the content of which is incorporated herein in the entirety by reference.

TECHNICAL FIELD

The present disclosure relates to the field of a sensor detection technology, in particular to a shear-type vibration-ultrasonic composite sensor and a measuring device.

BACKGROUND

The acoustic technology continuously develops, ultrasonic and vibration detection technologies not only exist in the conventional industrial and agricultural technologies, but also have been merged into high and new technologies such as power, national defense, biology, medicine, aerospace, and the like, and particularly are very widely applied in the aspects of state detection and monitoring of power equipment. When the power equipment has an electrical fault, the deterioration of insulation performance is often accompanied by the occurrence of partial discharge, and an ultrasonic signal (the frequency is higher than 20 kHz) caused by partial discharge is strong in penetrating power and good in directivity in a medium and is easy to inspect rapidly and accurately in an online or offline nondestructive mode, and thus, ultrasonic detection is often used for detecting the electrical fault of the power equipment. When the power equipment has a mechanical defect, the mechanical motion will be generated under the action of an alternating electrodynamic force generated by a load current, then an abnormal vibration signal will be generated, and vibration signals have obvious features in cases of different mechanical defects. Therefore, vibration detection for an equipment shell is suitable for detecting a mechanical fault of the power equipment.

In general, the running state of the equipment is influenced jointly by multiple aspects of factors of electrics, mechanism, and the like, but a current equipment fault diagnosis method mainly evaluates the equipment state based on detection of a single physical quantity, and such method is poor in accuracy and limited in detection fault type, cannot simultaneously and accurately obtain multiple physical quantity parameters of a certain point on the equipment, and is difficult to comprehensively reflect the comprehensive running state of the equipment; and currently, an accelerator piezoelectric sensor mainly adopts a compressed structure and is relatively simple in structure, and due to the fact that a piezoelectric element is directly placed on a sensor base, interference signals such as noise, a base strain, and the like have relatively strong influence on measurement of the sensor.

The information disclosed in the prior art is merely used for enhancing understanding on the background of the present disclosure, and thus may include information which does not constitute the prior art commonly known by those ordinary skilled in the art.

SUMMARY

The objective of the present disclosure is to provide a shear-type vibration-ultrasonic composite sensor and a measuring device. According to the present disclosure, when sensitivity and anti-interference performance of the sensor are improved, ultrasonic and vibration acceleration signals of the same position of equipment are accurately obtained so as to implement multi-physical-quantity high-accuracy detection of the equipment.

In order to achieve the objective above, the present disclosure provides the following technical solution that:

A shear-type vibration-ultrasonic composite sensor according to the present disclosure includes:

A metal matching layer, which includes an insulating layer arranged on a lower surface and a supporting pillar arranged on an upper surface and is in contact with a to-be-detected object via the insulating layer;

A first normal piezoelectric element, which includes a first negative electrode face clung to the upper surface and a first positive electrode face opposite to the first negative electrode face;

A second normal piezoelectric element, which includes a second positive electrode face clung to the first positive electrode face via a conductive adhesive and a second negative electrode face opposite to the second positive electrode face, the first positive electrode face and the second positive electrode face being respectively connected with an ultrasonic signal output interface to output an ultrasonic signal;

A backing block, which has a first surface clung to the second negative electrode face and a second surface opposite to the first surface, the second surface being provided with a metal housing;

A vibrating base, which is in detachable connection with the supporting pillar;

A first tangential piezoelectric element, which has a first negative electrode surface attached to one side of the vibrating base and a first positive electrode surface opposite to the first negative electrode surface, the first positive electrode surface being attached to a first mass block; and A second tangential piezoelectric element, which has a second negative electrode surface attached to the other side of the vibrating base opposite to the one side and a second positive electrode surface opposite to the second negative electrode surface, the second positive electrode surface being attached to a second mass block, the first mass block and the second mass block being respectively connected with a vibration signal output interface to output a vibration signal.

In the shear-type vibration-ultrasonic composite sensor, the acoustic impedance $Z_m$ of the metal matching layer is that:

$$Z_m = (Z_p Z_t)^{\frac{1}{2}} \text{ or } Z_m = (Z_p Z_t^2)^{\frac{1}{3}},$$

wherein $Z_p$ represents the acoustic impedances of the first normal piezoelectric element and the second normal piezoelectric element, and $Z_t$ represents the acoustic impedance of the detected object.

In the shear-type vibration-ultrasonic composite sensor, the thickness of the metal matching layer is one quarter of the acoustic wavelength corresponding to the center frequency of the composite sensor.

In the shear-type vibration-ultrasonic composite sensor, the metal housing is of a trumpet-shaped structure.

The shear-type vibration-ultrasonic composite sensor further includes:

A sensor shell, which is arranged in a sleeving mode on the metal matching layer;

A first insulating spring, one end of the first insulating spring being connected with the first mass block, and the other end of the first insulating spring being connected with one side of the inner wall of the sensor shell; and A second insulating spring, one end of the second insulating spring being connected with the second mass block, and the other end of the second insulating spring being connected with the other side of the inner wall of the sensor shell opposite to the one side.

In the shear-type vibration-ultrasonic composite sensor, the sensor shell is in detachable connection with the metal matching layer, and the sensor shell is provided with a cover which is in detachable connection and a channel for exporting the vibration signal output interface and the ultrasonic signal output interface.

In the shear-type vibration-ultrasonic composite sensor, the metal matching layer is of a centrosymmetric structure, the supporting pillar is located on the central axis of the metal matching layer, and the first normal piezoelectric element, the second normal piezoelectric element, and the backing block are arranged in a sleeving mode on the supporting pillar.

In the shear-type vibration-ultrasonic composite sensor, the metal housing is equipotential with the first negative electrode face, the second negative electrode face, the first negative electrode surface, and the second negative electrode surface.

In the shear-type vibration-ultrasonic composite, the first positive electrode surface is equipotential with the first mass block, and the second positive electrode surface is equipotential with the second mass block.

A measuring device includes:

The shear-type vibration-ultrasonic composite sensor;

A signal conditioner, which is connected with the vibration signal output interface and the ultrasonic signal output signal; and An oscilloscope, which is connected with the signal conditioner.

In the technical solution above, the shear-type vibration-ultrasonic composite sensor provided by the present disclosure has the following beneficial effects that: by adopting the shear-type vibration-ultrasonic composite sensor structure, the sensor can measure ultrasonic and vibration acceleration signals of the same position of the detected object, and can effectively reduce influence of interference signals such as noise, a base strain, and the like on signal measurement of vibration acceleration so as to implement multi-physical-quantity high-accuracy measurement. The sensor has the advantages of high stability, convenience in manufacturing, low cost, high sensitivity, high signal-to-noise ratio, high anti-interference performance, high strain resistance, and the like.

BRIEF DESCRIPTION OF THE DRAWINGS

In order to illustrate the technical solutions in the embodiments of the present application or the prior art more clearly, accompanying drawings which need to be used in the embodiments will be briefly illustrated below. It is obvious that the accompanying drawings described below are merely some embodiments recorded in the present disclosure, and those ordinary skilled in the art can also obtain other accompanying drawings according to these accompanying drawings.

DETAILED DESCRIPTION OF THE EMBODIMENTS

Figure 1:
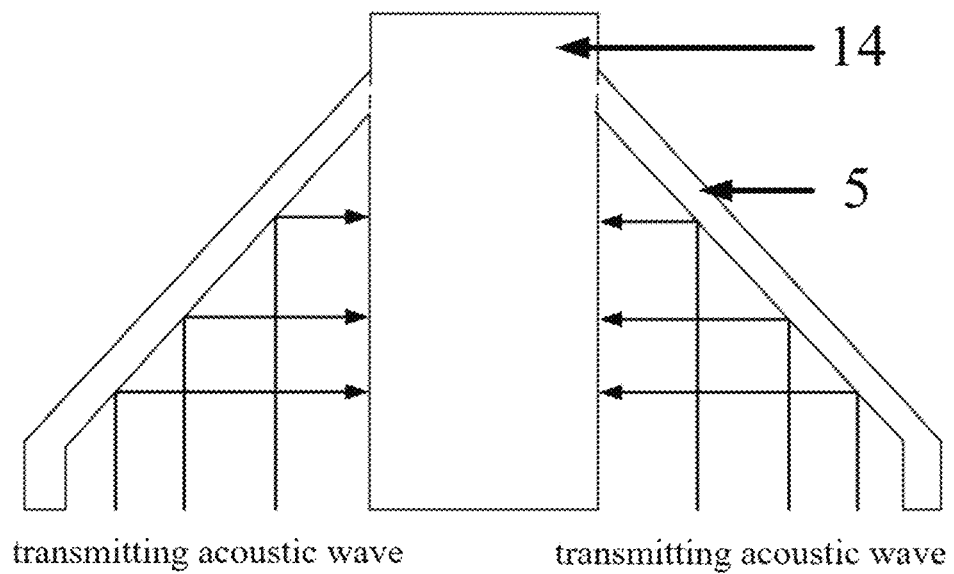
FIG. 1 is a structural schematic diagram of a metal housing of one embodiment of a shear-type vibration-ultrasonic composite sensor.

In order to make objectives, technical solutions and advantages of the embodiments of the disclosure apparent, the technical solutions in the embodiments of the present disclosure will be described in a clearly and fully understandable way in connection with FIG. 1 to FIG. 6 in the embodiments of the present disclosure. It is obvious that the described embodiments are just a part but not all of the embodiments of the present disclosure. Based on the embodiments in the present disclosure, those ordinary skilled in the art can obtain other embodiment(s), without any inventive work, which should be within the scope of the present disclosure.

The detailed description below on the embodiments of the present disclosure provided in the drawings are not intended to limit the scope of the present disclosure claimed, but just represent the selected embodiments of the present disclosure. Based on the embodiments in the present disclosure, all other embodiments obtained by those ordinary skilled in the art without any inventive work shall fall within the scope of protection of the present disclosure.

It should be noted that similar signs and letters represent similar items in the drawings below, and thus, once a certain item is defined in one drawing, it does not need to be further defined or explained in the subsequent drawings.

In the description of the present disclosure, it should be understood that directional or positional relationships indicated by terms such as "center", "longitudinal", "transverse", "length", "width", "thickness", "upper", "lower", "front", "back", "left", "right", "vertical", "horizontal", "top", "bottom", "inner", "outer", "clockwise", "anticlockwise", and the like are directional or positional relationships as shown in the drawings, which only means to facilitate description of the disclosure and simplify the description, but do not indicate or imply that the equipment or components must have specific directions or be constructed or operated in the specific directions, and thus should not be understood as limitation on the present disclosure.

In addition, terms such as "first" and "second" are merely used for description, and should not be understood as indication or implication on relative importance or implicit indication on the number of the indicated technical features. Therefore, features defined by "first" and "second" can explicitly or implicitly include one or more features. In the description of the present disclosure, the phrase "a plurality of" indicates that there are two or more than two, unless otherwise specifically defined.

In the present disclosure, unless otherwise specifically regulated and defined, terms "mounted", "connected", "linked", "fixed", and the like should be broadly understood, for example, they may be fixedly connected, detachably connected, or integrally connected; or may be directly connected, indirectly connected by a medium; or may be internally communicated between two components or in an interaction relationship between two components. Those ordinary skilled in the art can understand specific meanings of the terms in the present disclosure according to specific conditions.

In the present disclosure, unless otherwise specifically regulated and defined, a first feature being located "on" or "under" a second feature may include that the first feature and the second feature are in direct contact, or may include the first feature and the second feature are not in direct contact, but are in contact by an additional feature between them. Moreover, the first feature being located "on", "above" or "over" includes that the first feature is located right above or diagonally above the second feature, or just represents that the horizontal height of the first feature is greater than that of the second feature. The first feature being located "under", "below" and "at the bottom" includes that the first feature is located right below or diagonally below the second feature, or just represents that the horizontal height of the first feature is smaller than that of the second feature.

In order to enable those skilled in the art to understand the technical solution of the present disclosure better, the present disclosure will be further illustrated in detail below in combination with the drawings.

In one embodiment, as shown in FIG. 1 to FIG. 5, a shear-type vibration-ultrasonic composite sensor includes:

A metal matching layer 2, which includes an insulating layer 1 arranged on a lower surface and a supporting pillar 14 arranged on an upper surface and is in contact with a to-be-detected object via the insulating layer 1;

A first normal piezoelectric element 15, which includes a first negative electrode face clung to the upper surface and a first positive electrode face opposite to the first negative electrode face;

A second normal piezoelectric element 3, which includes a second positive electrode face clung to the first positive electrode face via a conductive adhesive and a second negative electrode face opposite to the second positive electrode face, the first positive electrode face and the second positive electrode face being jointly connected with an ultrasonic signal output interface 11 to output an ultrasonic signal;

A backing block 4, which has a first surface clung to the second negative electrode face and a second surface opposite to the first surface, the second surface being provided with a metal housing 5;

A vibrating base 13, which is in detachable connection with the supporting pillar 14;

A first tangential piezoelectric element 6, which has a first negative electrode surface attached to one side of the vibrating base 13 and a first positive electrode surface opposite to the first negative electrode surface, the first positive electrode surface being attached to a first mass block 8; and A second tangential piezoelectric element 16, which has a second negative electrode surface attached to the other side of the vibrating base 13 opposite to the one side and a second positive electrode surface opposite to the second negative electrode surface, the second positive electrode surface being attached to a second mass block 17, the first mass block 8 and the second mass block 17 being respectively connected with a vibration signal output interface 12 to output a vibration signal.

In a preferred embodiment of the shear-type vibration-ultrasonic composite sensor, the acoustic impedance $Z_m$ of the metal matching layer 2 is that:

$$Z_m = (Z_p Z_t)^{\frac{1}{2}} \text{ or } Z_m = (Z_p Z_t^2)^{\frac{1}{3}},$$

wherein $Z_p$ represents the acoustic impedances of the first normal piezoelectric element 15 and the second normal piezoelectric element 3, and $Z_t$ represents the acoustic impedance of the detected object.

In a preferred embodiment of the shear-type vibration-ultrasonic composite sensor, the thickness of the metal matching layer 2 is one quarter of the acoustic wavelength corresponding to the center frequency of the composite sensor.

As shown in FIG. 1, in a preferred embodiment of the shear-type vibration-ultrasonic composite sensor, the metal housing 5 is of a trumpet-shaped structure.

In a preferred embodiment of the shear-type vibration-ultrasonic composite sensor, the shear-type vibration-ultrasonic composite sensor further includes:

A sensor shell 9, which is arranged in a sleeving mode on the metal matching layer 2;

A first insulating spring 7, one end of the first insulating spring 7 being connected with the first mass block 8, and the other end of the first insulating spring 7 being connected with one side of the inner wall of the sensor shell 9; and A second insulating spring 18, one end of the second insulating spring 18 being connected with the second mass block 17, and the other end of the second insulating spring 18 being connected with the other side of the inner wall of the sensor shell 9 opposite to the one side.

In a preferred embodiment of the shear-type vibration-ultrasonic composite sensor, the sensor shell 9 is in detachable connection with the metal matching layer 2, and the sensor shell 9 is provided with a cover 10 which is in detachable connection and a channel for exporting the vibration signal output interface 12 and the ultrasonic signal output interface 11.

In a preferred embodiment of the shear-type vibration-ultrasonic composite sensor, the metal matching layer 2 is of a centrosymmetric structure, the supporting pillar 14 is located on the central axis of the metal matching layer 2, and the first normal piezoelectric element 15, the second normal piezoelectric element 3, and the backing block 4 are arranged in a sleeving mode on the supporting pillar 14.

In a preferred embodiment of the shear-type vibration-ultrasonic composite sensor, the metal housing 5 is equipotential with the first negative electrode face, the second negative electrode face, the first negative electrode surface, and the second negative electrode surface.

In a preferred embodiment of the shear-type vibration-ultrasonic composite sensor, the first positive electrode surface is equipotential with the first mass block 8, and the second positive electrode surface is equipotential with the second mass block 17.

In one embodiment, the shear-type vibration-ultrasonic composite sensor is of a compressed structure and a shear-type structure from bottom to top, the compressed structure includes the metal matching layer 2, the first normal piezoelectric element 15 and the second normal piezoelectric element 3, and the backing block 4, and the shear-type structure includes the vibrating base 13, the first tangential piezoelectric element 6 and the second tangential piezoelectric element 16, the first mass block 8, the first insulating spring 7, the second mass block 17, and the second insulating spring 18. The shear-type vibration-ultrasonic composite sensor further includes the sensor shell 9 and a lead, wherein the compressed structure is used for detecting the ultrasonic signal, and the shear-type structure is used for detecting a vibration acceleration signal.

In one embodiment, the first negative electrode face of the first normal piezoelectric element 15 is tightly adhered to an upper surface of the metal matching layer 2 by the conductive adhesive; the first positive electrode face of the first normal piezoelectric element 15 is tightly adhered to the second positive electrode face of the second normal piezoelectric element 3 by the conductive adhesive; the second negative electrode face of the second normal piezoelectric element 3 is tightly adhered to a lower surface of the backing block 4, i.e., the first surface, by the conductive adhesive, and the conductive adhesive is smeared on a backing surface, i.e., the second surface, so as to ensure that equipotential connection is implemented between the metal housing 5 of the backing block 4 and the second negative electrode face of the second normal piezoelectric element 3; the side leading-out ends of positive electrodes of the first normal piezoelectric element 15 and the second normal piezoelectric element 3 are connected with the ultrasonic signal output interface 11 by soldering signal lines so as to implement output of the ultrasonic signal; the vibrating base 13 is in tight connection with the supporting pillar 14 of the metal matching layer 2 by a thread structure; the first negative electrode surface and the second negative electrode surface of the first tangential piezoelectric element 6 and the second tangential piezoelectric element 16 are respectively and tightly adhered to the outer surfaces of both sides of the vibrating base 13 by the conductive adhesive; the first positive electrode surface and the second positive electrode surface of two tangential piezoelectric elements are respectively and tightly adhered to two mass blocks by the conductive adhesive, and two mass blocks are connected to the vibration signal interface through signal lines so as to implement output of the vibration signal; and the entire part is placed into the sensor shell 9, the insulating spring is fixedly mounted between a buckle outside the mass block and the metal housing 5, two signal output lines are respectively led out through small holes on the sides of the housing, and the sensor is sealed by the metal cover 10.

In one embodiment, the first normal piezoelectric element 15 and/or the second normal piezoelectric element 3 are piezoelectric element pieces in a normal vibrating mode, and two normal piezoelectric elements are placed in a "back-to-back" mode so as to implement connection of two positive electrodes, thereby improving sensitivity of detecting the ultrasonic signal by the composite sensor; the first tangential piezoelectric element 6 and/or the second tangential piezoelectric element 16 are piezoelectric element pieces in a tangential vibrating mode, and positive electrodes of two tangential piezoelectric elements are connected, thereby improving sensitivity of detecting the vibration signal by the composite sensor. The tangential direction is perpendicular to the normal direction.

In one embodiment, a material of the metal matching layer 2 is decided by the acoustic impedance of the detected object and the acoustic impedance of the normal piezoelectric element together, and generally is, but not limited to, a ceramic, metal or metal oxide element; and in addition, the measuring face of the metal matching layer 2 is smeared with a thin insulating layer 1, so that not only can an acoustic matching layer be protected, but also the ground return circuit interference in the working process of the composite sensor can be avoided.

Figure 2:
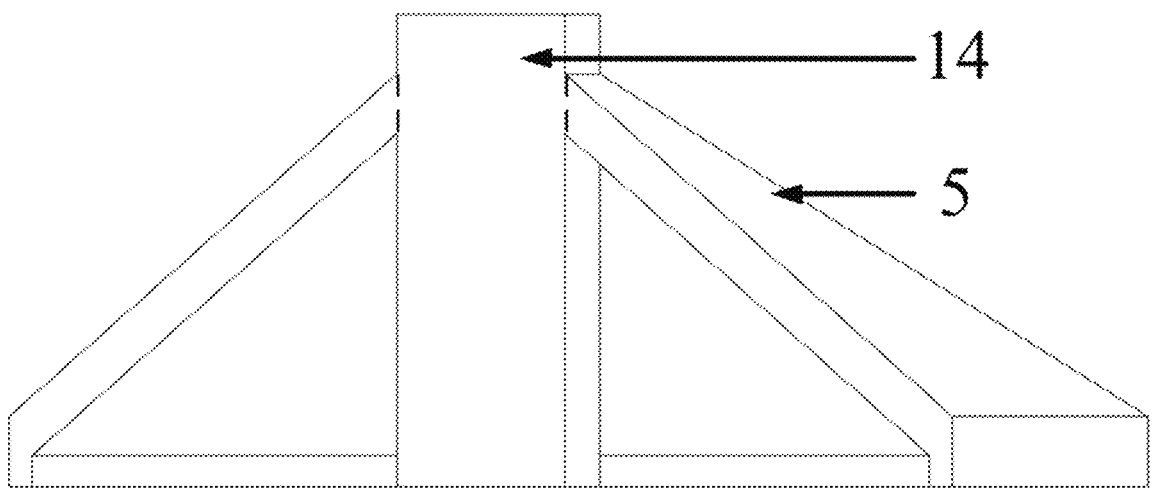
FIG. 2 is a structural schematic diagram of a metal housing of one embodiment of the shear-type vibration-ultrasonic composite sensor.

In one embodiment, as shown in FIG. 2, the backing block 4 is composed of the metal housing 5 and a backing. The metal housing 5 is of a trumpet shape, the lower portion is wide, the upper portion is narrow, the lower portion is hollow and is used for backing filling, and the size is approximate to that of the contact surface of the piezoelectric element; and a round hole is reserved at the upper portion of the metal housing, so that the supporting pillar passes through the round hole to mount the backing.

In one embodiment, the metal matching layer 2 is in threaded tight connection with the vibrating base 13, and both the metal matching layer 2 and the vibrating base 13 are metal conductors, so that electrical connection of the metal matching layer 2 and the vibrating base 13 is implemented.

In one embodiment, the first mass block 8 and/or the second mass block 17 are made of a metal good conductor which generally is, but not limited to, good conductor metal with the relatively high density, such as yellow brass, tungsten, gold, and the like. The mass block has a certain mass per se and constitutes an inertial system in the shear-type vibrating sensor portion. The size of the contact surface of the mass block is approximate to that of the electrode face of the tangential piezoelectric element; and the solid protruding buckle is arranged outside the mass block and used for fixing and supporting the insulating spring.

In one embodiment, the spring is the insulating spring, and can apply a pretightening force, so that the inertia force generated by the mass block can be well applied to the tangential piezoelectric element and excessive relative sliding between the tangential piezoelectric element and the mass block can be avoided. The insulation feature of the insulating spring can ensure that there is no electrical connection between the mass block and the metal housing 5.

In one embodiment, in the present disclosure, the material selection and the thickness size for the metal matching layer 2 should follow the following principle that: for different application and detection objects, the material selection of the metal matching layer 2 is different, it is very important to select a reasonable matching layer material for improving performance of the sensor, and a material with high acoustic transmittance and matched impedance should be selected to produce the matching layer. If it is known that the acoustic impedances of the piezoelectric element and the detected object respectively are $Z_p$ and $Z_t$, the acoustic impedance $Z_m$ of the metal matching layer 2 should be calculated by a formula that:

$$Z_m = (Z_p Z_t)^{\frac{1}{2}},$$

but for a broadband transducer for detection and imaging application, the calculation formula of the acoustic impedance of the matching layer is as follows:

$$Z_m = (Z_p Z_t^2)^{\frac{1}{3}};$$

and in addition, the thickness of the metal matching layer 2 should be determined based on a one-quarter-wavelength formula in the ultrasonics, i.e., the thickness of the matching layer should be one quarter of the acoustic wavelength corresponding to the center frequency of the sensor.

In one embodiment, as shown in FIG. 1, the backing block 4 is composed of the metal housing 5 and the backing, the metal housing 5 is made of metal and is of a trumpet shape, and such design can absorb acoustic waves projected through the piezoelectric element better so as to avoid interference of the secondary echo to the output signal of the sensor. The backing is formed by mixing epoxy resin and tungsten powder so as to achieve the damping effect, the proportion of the epoxy resin and the tungsten powder is directly related to the frequency response of the sensor, and sensors with different spectrum widths have different requirements for the proportion. Production of the backing block 4 can be completed by blending the backing according to the corresponding proportion, pouring the backing into the metal housing 5, and carrying out planishing and polishing after the blanking is solidified.

In one embodiment, when the composite sensor detects the vibration signal, due to the specificity of the shear-type structure, the vibrating base and the mass block are different in motion state, two electrode faces of the first tangential piezoelectric element 6 and the second tangential piezoelectric element 16 will be applied with a shearing force, two electrode faces of the element generate electrical charges with opposite polarities, and the electrical charge quantity is in direct proportion to the shearing force, and thus, the vibration acceleration condition can be reflected. The piezoelectric element has dielectricity, one single piezoelectric piece can be regarded as one equivalent plate capacitor, and it can be obtained that:

$$U = \frac{Q}{C}, C = \frac{\varepsilon A}{4\pi k d} = \frac{\varepsilon A}{Kd}, \text{ and } Q = d_{ij}F_g = d_{ij} \cdot ma,$$

Wherein C represents the equivalent capacitance, and Q represents the electrical charge quantity; $K=4^\pi kd$ is a constant, k is a static constant, $\varepsilon$ is a dielectric constant, and d represents a capacitance plate spacing, i.e., the thickness of the tangential piezoelectric element; and $d_{ij}$ is a piezoelectric coefficient of the piezoelectric element, m represents the mass of an inertial part, and a represents the acceleration. Therefore, the expression of the electrical charge sensitivity Sq of the tangential piezoelectric element can be obtained as follows:

$$S_q = d_{31}mn,$$

In the formula, $d_{31}$ represents a tangential piezoelectric coefficient of the piezoelectric element, m represents the mass of the inertial part, and n represents the number of piezoelectric pieces. It can be known from the formula that the mass block is one of the main factors of deciding the sensitivity of the shear-type composite sensor, the greater the mass of the inertial part is, the higher the sensitivity of the shear-type composite sensor is, but increase of the mass of the inertial part may cause increase of the volume of the composite sensor and reduction of the inherent frequency and the frequency width of the composite sensor. Therefore, with respect to the mass block, in order to reduce the size of the structure, it is better to provide greater mass under the same volume condition. The mass block is generally made of a metal good conductor such as high-density metal or alloy and the like, and generally is, but not limited to, metal with the relatively high density, such as yellow brass, tungsten, gold, and the like. The size of the contact surface of the mass block is approximate to that of the electrode face of the tangential piezoelectric element; and the solid protruding buckle is arranged outside the mass block and used for fixing and supporting the insulating spring.

In one embodiment, the ultrasonic signal is a mechanical wave with the vibration frequency of over 20 kHz in essence, when the composite sensor detects the ultrasonic signal, the first normal piezoelectric element 15 and the second normal piezoelectric element 3 will generate the polarization phenomenon under the action of an ultrasonic wave mechanical force, i.e., a piezoelectric crystal generates deformation under the influence of mechanical vibration, and at the moment, positive and negative electrical charges with the equal electrical charge quantities are respectively aggregated on two electrode faces of the normal piezoelectric element, the mechanical force T is in direct proportion to the electrical charge quantity $Q$, and the relational expression that $Q = d_{33} \ulcorner T$ is met, wherein $d_{33}$ represents a normal piezoelectric coefficient. If the sensor is regarded as a capacitor and the capacitance of the capacitor is C, the output voltage ultrasonically detected by the composite sensor is that:

$$U = \frac{d_{33} \ulcorner T}{C}.$$

Under the normal conditions, the value of the capacitance C is only changed a little in the measuring process and is regarded as a constant value, and the expression above shows that the output voltage ultrasonically detected by the composite sensor is in direct proportion to the amplitude of the detected ultrasonic signal.

In one embodiment, under the ultrasonic detection frequency, the shear-type structure is limited to a first resonant frequency and the structure specificity, and in a case of over 4 kHz, an output error of the tangential piezoelectric element is relatively large and the working effect is poor, and thus, in the ultrasonic detecting process, it is subject to an output of the normal piezoelectric element.

Figure 3:
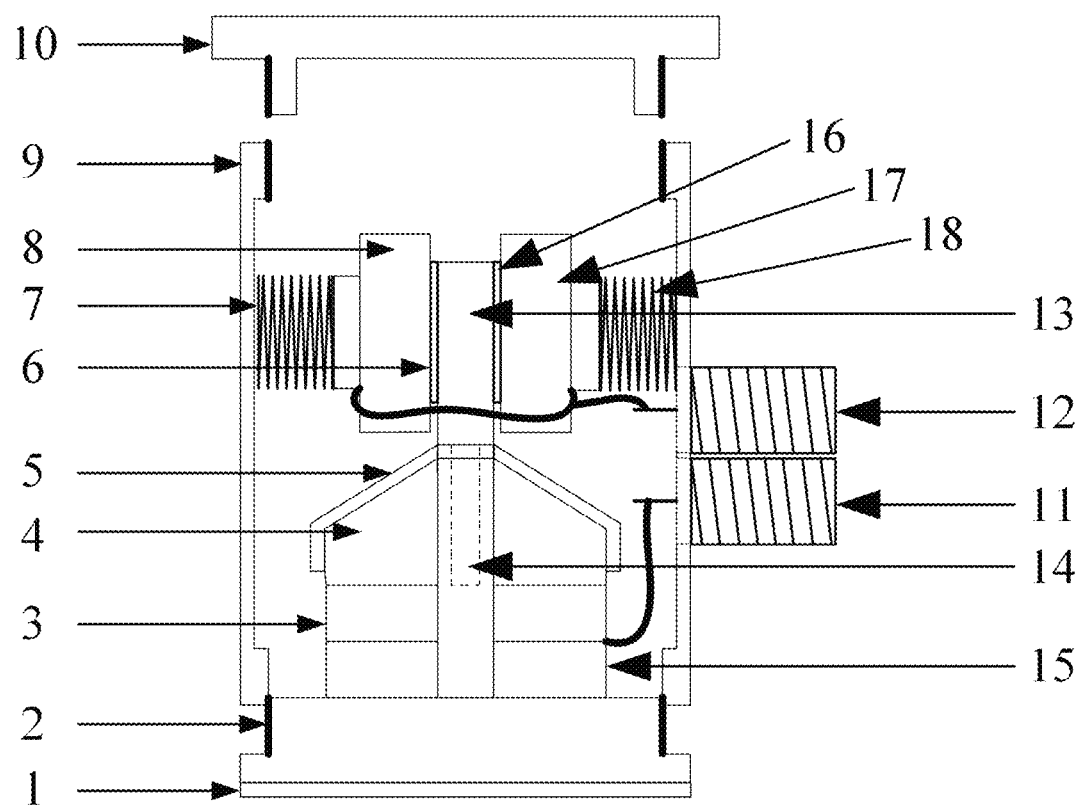
FIG. 3 is a structural schematic diagram of one embodiment of the shear-type vibration-ultrasonic composite sensor.
Figure 4:
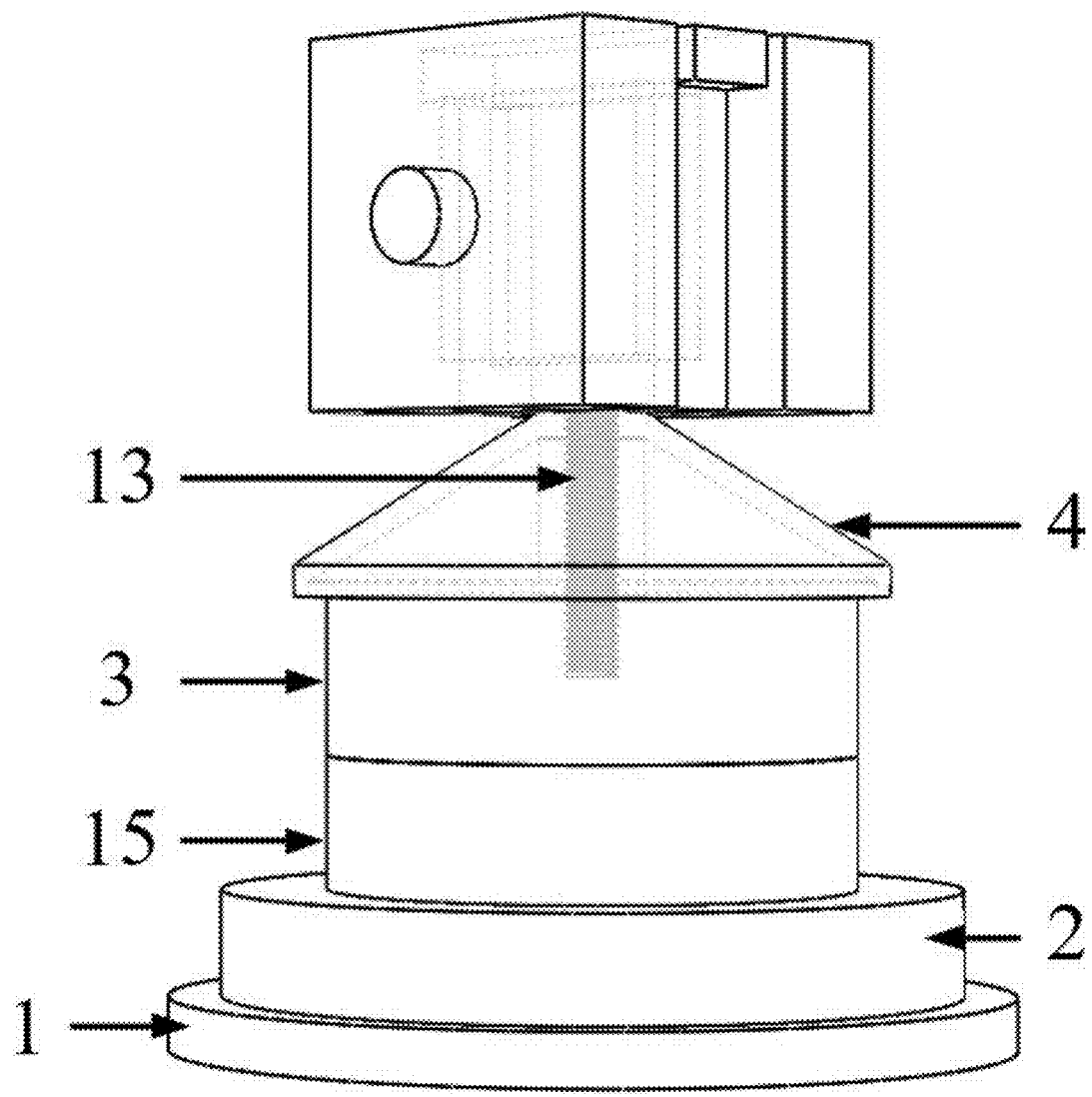
FIG. 4 is a stereoscopic structural schematic diagram of one embodiment of the shear-type vibration-ultrasonic composite sensor.
Figure 5:
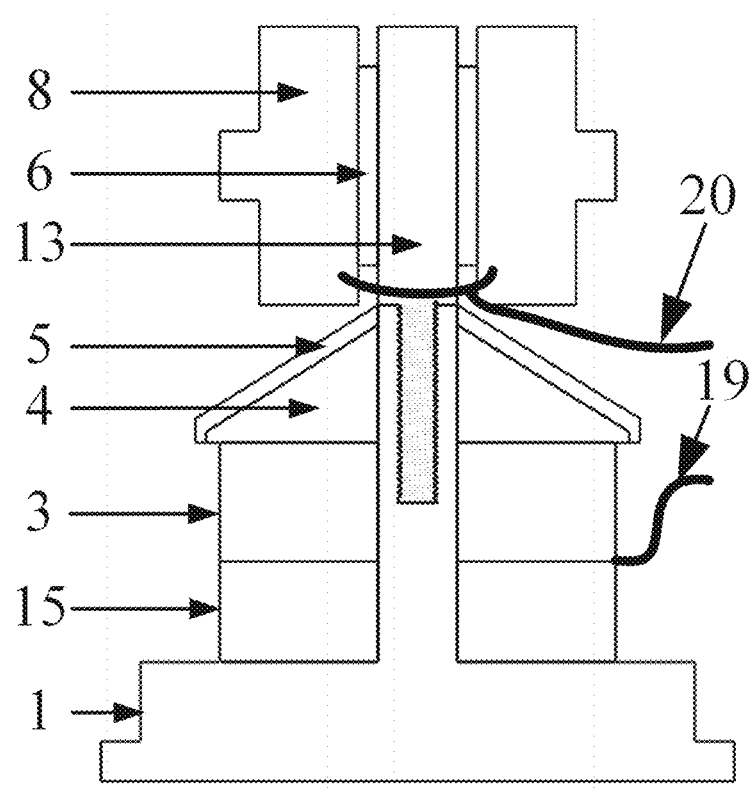
FIG. 5 is a sectional structural schematic diagram of one embodiment of the shear-type vibration-ultrasonic composite sensor.

As shown in FIG. 3 to FIG. 5, the assembling implementation process of the shear-type vibration-ultrasonic composite sensor is that: firstly, a layer of thin insulating material is attached to the lower surface of the metal matching layer 2 and polishing and smoothening are carried out so as to eliminate ground return circuit interference in the working process of the sensor and protect the acoustic matching layer; the first negative electrode face of the first normal piezoelectric element 15 is tightly adhered to the upper surface of the metal matching layer 2 by the conductive adhesive, and the obtained product is placed in a vacuum box to be vacuumized and cured at the high temperature; the first positive electrode face of the first normal piezoelectric element 15 is tightly adhered to the second positive electrode face of the second normal piezoelectric element 3 by the conductive adhesive, and the obtained product is placed into the vacuum box to be vacuumized and cured at the high temperature; the second negative electrode face of the second normal piezoelectric element 3 is tightly adhered to the lower surface of the backing block 4 by the conductive adhesive, and the conductive adhesive is smeared on the backing surface so as to ensure that the equal potential between the metal housing 5 of the backing block 4 and the negative electrode face of the normal piezoelectric element is implemented; the side leading-out ends of the positive electrodes of the two normal piezoelectric elements are connected with the ultrasonic signal output interface 11 by the soldering signal lines so as to implement output of the ultrasonic signal; the vibrating base 13 is in tight connection with the supporting pillar 14 of the metal matching layer 2 by the thread structure; the negative electrode surfaces of two tangential piezoelectric elements are respectively and tightly adhered to the outer surfaces of both sides of the vibrating base 13 by the conductive adhesive, and the obtained product is placed into the vacuum box to be vacuumized and cured at the high temperature; the positive electrode surfaces of two tangential piezoelectric elements are respectively and tightly adhered to two mass blocks by the conductive adhesive, and it is ensured that the positive electrode surfaces and the metal mass blocks are equipotential; positive electrodes of the two tangential piezoelectric elements are connected by signal lines and are jointly connected to the vibration signal output interface 12; the entire part is placed into the sensor shell 9, two signal output lines 19 and 20 are respectively led out through small holes on the sides of the housing, and the insulating spring with proper elasticity is fixedly mounted between the buckle outside the mass block and the metal housing 5 so as to apply a proper pre-tightening force; and finally, the sensor is sealed by the metal cover 10. In one embodiment, normal piezoelectric ceramics include the first normal piezoelectric element 15 and the second normal piezoelectric element 3, and tangential piezoelectric ceramics include the first tangential piezoelectric element 6 and the second tangential piezoelectric element 16.

The backing block of the present disclosure can absorb the acoustic waves projected through the piezoelectric element better so as to avoid interference of the secondary echo; and the proposed shear-type structure can effectively reduce influence of interference signals such as the noise, the base strain, and the like on the measurement of the sensor, and thus, according to the composite sensor, when sensitivity and anti-interference performance of the sensor are improved, the ultrasonic and vibration acceleration signals of the same position of equipment are accurately obtained so as to implement multi-physical-quantity high-accuracy detection of the equipment.

Figure 6:
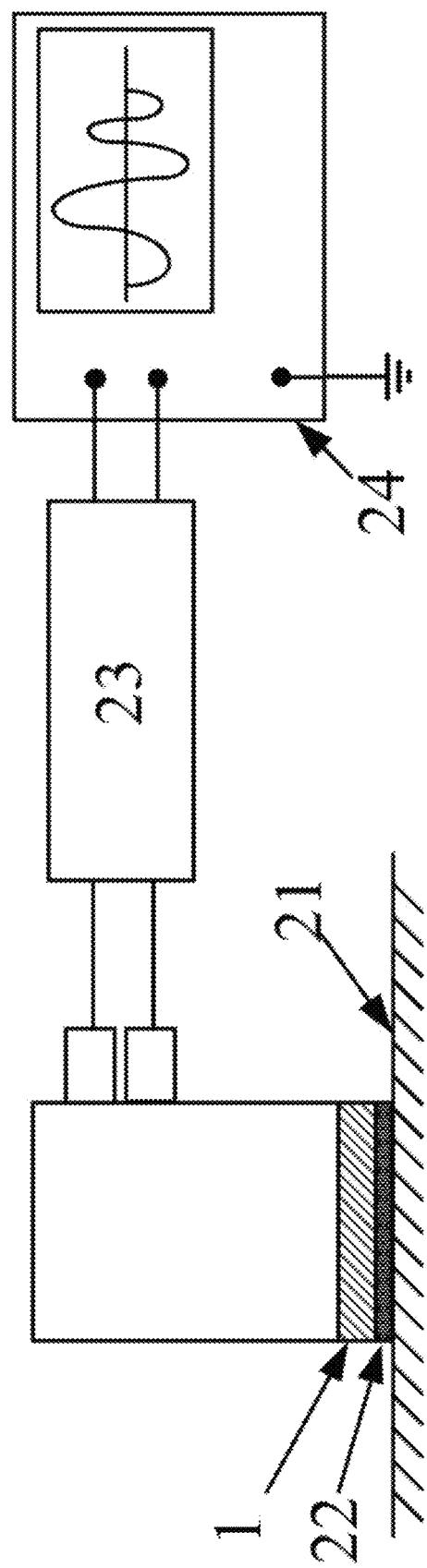
FIG. 6 is a structural schematic diagram of one embodiment of a measuring device.

As shown in FIG. 6, a measuring device includes:

The shear-type vibration-ultrasonic composite sensor;

A signal conditioner, which is connected with the vibration signal output interface 12 and the ultrasonic signal output signal 11; and An oscilloscope, which is connected with the signal conditioner.

In one embodiment, firstly, a measured point 21 with the flat surface is selected on a measured object to the greatest extent, and the measured point 21 is scrubbed cleanly; a coupling agent 22 is uniformly smeared at the measured point, the composite sensor is fixed at the measured point, and the surface of the insulating layer 1 of the composite sensor is in tight contact with the measured position; two signal output lines of the composite sensor access two channels of the signal conditioner 23, and processing such as amplification, filtering, and the like is carried out on output signals; and finally, the output signals are acquired by the oscilloscope 24.

Finally, it should be illustrated that the described embodiments are just a part but not all of the embodiments of the present application. Based on the embodiments in the present application, those skilled in the art can obtain other embodiment(s), without any inventive work, which should be within the scope of protection of the present application.

The above only describes some exemplary embodiments of the present disclosure in an illustrating mode, and there is no doubt that those ordinary skilled in the art may modify the described embodiments in various different modes without departure from the spirit and the scope of the present disclosure. Therefore, the drawings and the description above are illustrative in essence, and should not be understood as limitation on the scope of protection of claims of the present disclosure.

What is claimed is:

1. A shear-type vibration-ultrasonic composite sensor, comprising:
    a metal matching layer, which comprises an insulating layer arranged on a lower surface and a supporting pillar arranged on an upper surface and is in contact with a to-be-detected object via the insulating layer;
    a first normal piezoelectric element, which comprises a first negative electrode face clung to the upper surface and a first positive electrode face opposite to the first negative electrode face;
    a second normal piezoelectric element, which comprises a second positive electrode face clung to the first positive electrode face via a conductive adhesive and a second negative electrode face opposite to the second positive electrode face, the first positive electrode face and the second positive electrode face being jointly connected with an ultrasonic signal output interface to output an ultrasonic signal;
    a backing block, which has a first surface clung to the second negative electrode face and a second surface opposite to the first surface, the second surface being provided with a metal housing;
    a vibrating base, which is in detachable connection with the supporting pillar;
    a first tangential piezoelectric element, which has a first negative electrode surface attached to one side of the vibrating base and a first positive electrode surface opposite to the first negative electrode surface, the first positive electrode surface being attached to a first mass block; and
    a second tangential piezoelectric element, which has a second negative electrode surface attached to the other side of the vibrating base opposite to the one side and a second positive electrode surface opposite to the second negative electrode surface, the second positive electrode surface being attached to a second mass block, the first mass block and the second mass block being respectively connected with a vibration signal output interface to output a vibration signal.

2. The shear-type vibration-ultrasonic composite sensor according to claim 1, wherein the acoustic impedance $Z_m$ of the metal matching layer is that:

$$Z_m = (Z_p Z_t)^{\frac{1}{2}} \text{ or } Z_m = (Z_p Z_t^2)^{\frac{1}{3}},$$

wherein $Z_p$ represents the acoustic impedances of the first normal piezoelectric element and the second normal piezoelectric element, and $Z_t$ represents the acoustic impedance of the detected object.

3. The shear-type vibration-ultrasonic composite sensor according to claim 1, wherein the thickness of the metal matching layer is one quarter of the acoustic wavelength corresponding to the center frequency of the composite sensor.

4. The shear-type vibration-ultrasonic composite sensor according to claim 1, wherein the metal housing is of a trumpet-shaped structure.

5. The shear-type vibration-ultrasonic composite sensor according to claim 1, further comprising:
- a sensor shell, which is arranged in a sleeving mode on the metal matching layer;
- a first insulating spring, one end of the first insulating spring being connected with the first mass block, and the other end of the first insulating spring being connected with one side of the inner wall of the sensor shell; and
- a second insulating spring, one end of the second insulating spring being connected with the second mass block, and the other end of the second insulating spring being connected with the other side of the inner wall of the sensor shell opposite to the one side.

6. The shear-type vibration-ultrasonic composite sensor according to claim 5, wherein the sensor shell is in detachable connection with the metal matching layer, and the sensor shell is provided with a cover which is in detachable connection and a channel for exporting the vibration signal output interface and the ultrasonic signal output interface.

7. The shear-type vibration-ultrasonic composite sensor according to claim 1, wherein the metal matching layer is of a centrosymmetric structure, the supporting pillar is located on the central axis of the metal matching layer, and the first normal piezoelectric element, the second normal piezoelectric element, and the backing block are arranged in a sleeving mode on the supporting pillar.

8. The shear-type vibration-ultrasonic composite sensor according to claim 1, wherein the metal housing is equipotential with the first negative electrode face, the second negative electrode face, the first negative electrode surface, and the second negative electrode surface.

9. The shear-type vibration-ultrasonic composite sensor according to claim 1, wherein the first positive electrode surface is equipotential with the first mass block, and the second positive electrode surface is equipotential with the second mass block.

10. A measuring device, comprising:
- the shear-type vibration-ultrasonic composite sensor according to claim 1;
- a signal conditioner, which is connected with the vibration signal output interface and the ultrasonic signal output signal; and
- an oscilloscope, which is connected with the signal conditioner.

11. The measuring device of claim 10, wherein the acoustic impedance $Z_m$ of the metal matching layer is that:

$$Z_m = (Z_p Z_t)^{\frac{1}{2}} \text{ or } Z_m = (Z_p Z_t^2)^{\frac{1}{3}},$$

wherein $Z_p$ represents the acoustic impedances of the first normal piezoelectric element and the second normal piezoelectric element, and $Z_t$ represents the acoustic impedance of the detected object.

12. The measuring device of claim 10, wherein the thickness of the metal matching layer is one quarter of the acoustic wavelength corresponding to the center frequency of the composite sensor.

13. The measuring device of claim 10, wherein the metal housing is of the trumpet-shaped structure.

14. The measuring device of claim 10, further comprising:
- the sensor shell, which is arranged in a sleeving mode on the metal matching layer;
- the first insulating spring, one end of the first insulating spring being connected with the first mass block, and the other end of the first insulating spring being connected with one side of the inner wall of the sensor shell; and
- the second insulating spring, one end of the second insulating spring being connected with the second mass block, and the other end of the second insulating spring being connected with the other side of the inner wall of the sensor shell opposite to the one side.

15. The measuring device of claim 14, wherein the sensor shell is in detachable connection with the metal matching layer, and the sensor shell is provided with the cover which is in detachable connection and the channel for exporting the vibration signal output interface and the ultrasonic signal output interface.

16. The measuring device of claim 10, wherein the metal matching layer is of the centrosymmetric structure, the supporting pillar is located on the central axis of the metal matching layer, and the first normal piezoelectric element, the second normal piezoelectric element, and the backing block are arranged in the sleeving mode on the supporting pillar.

17. The measuring device of claim 10, wherein the metal housing is equipotential with the first negative electrode face, the second negative electrode face, the first negative electrode surface, and the second negative electrode surface.

18. The measuring device of claim 10, wherein the first positive electrode surface is equipotential with the first mass block, and the second positive electrode surface is equipotential with the second mass block.

* * * * *